United States Patent [19]

Cowsert

[11] 3,858,152

[45] Dec. 31, 1974

[54] INTERCEPT CONNECTOR SUITABLE FOR USE IN A TELEPHONE SYSTEM

[75] Inventor: Charles A. Cowsert, Council Grove, Kans.

[73] Assignee: Monarch Molding, Inc., Council Grove, Kans.

[22] Filed: July 13, 1973

[21] Appl. No.: 378,907

[52] U.S. Cl. .......... 339/17 C, 174/68.5, 339/150 B, 339/220 R, 339/275 B

[51] Int. Cl. .......................... H01r 5/04, H05k 1/02

[58] Field of Search ............ 339/17, 18, 19, 65, 66, 339/119, 125, 150, 151, 275, 258, 220

[56] References Cited

UNITED STATES PATENTS

| | | | |
|---|---|---|---|
| 2,953,766 | 9/1960 | Clewes | 339/220 R X |
| 3,155,767 | 11/1964 | Schellack | 339/220 R X |
| 3,312,927 | 4/1967 | Garrett | 339/150 R X |
| 3,701,076 | 10/1972 | Irish | 339/17 C |

*Primary Examiner*—James T. McCall
*Assistant Examiner*—Terrell P. Lewis
*Attorney, Agent, or Firm*—Burns, Doane, Swecker & Mathis

[57] ABSTRACT

An intercept connector insertable onto the arms of a telephone terminal block to cross-connect terminals thereof comprising a backing board, a plurality of clips located on the front side of the backing board, and a plurality of printed circuit paths fixed on the backside thereof. Each clip includes a folded strip of metal defining base, top and bight portions. The bight portion is integral with the top and base portions and biases the former toward the latter. A distal end of the base portion includes a pair of retaining flanges defining an arm-receiving mouth. A distal end of the top portion includes a cam lip located at the receiving mouth. A pair of tabs extend from the base portion through apertures in the backing board. An anchor bead of hardened metallic material is disposed on the backside of the backing board and adheres to both tabs and to an associated circuit path to secure the clip to the backing board and electrically connect the clip to the circuit path.

3 Claims, 5 Drawing Figures

PATENTED DEC 31 1974 3,858,152

INTERCEPT CONNECTOR SUITABLE FOR USE IN A TELEPHONE SYSTEM

BACKGROUND AND OBJECTS OF THE INVENTION

This invention relates to an intercept connector for use in conjunction with a wire wrap terminal block of a telephone system.

Telephone systems conventionally include a wire wrap terminal block having a plurality of rows of electrical terminals, usually six terminals per row. Three terminals of each row normally connect the subscriber's telephone line to the main switching mechanism of the telephone system, while the remaining three terminals of the row are normally connected solely to an intercept operator facility. When the subscriber's telephone is disconnected, or the telephone number thereof is changed, it becomes necessary to connect the main switching system to the intercept operator facility so that incoming calls will be re-routed thereto. In this fashion, the calling party may be given proper instructions. In order to accomplish this re-routing connection, it has been conventional to insert an intercept connector onto the terminal block in a manner providing a suitable cross connection between the three terminals of the main switching system and the three terminals of the intercept operator facility.

Intercept connectors are well known, various forms thereof being discussed in U.S. Pat. Nos. 3,138,417, 3,471,821, and 3,548,361, for example. These intercept connectors basically include an insulative backing board which carries contact clips. The contact clips comprise a conductive metallic material. Each clip includes a mounting plate portion which is connected to the backing board by means of a rivet or grommet. Usually integral with the mounting plate is a somewhat socket-like portion configured to receive an extension arm of a wire wrap terminal. This arm-receiving part of the intercept connector includes a portion which is urged toward the arm to effect an electrical connection between the arm and the clip. On the other side of the backing board there is disposed a printed circuit arrangement which electrically connects selected pairs of clips so that the intercept connector will cross-connect the main terminals with the intercept terminals when the intercept connector is inserted onto the terminal block. The conductive paths of the circuit generally terminate at the rivet members of the respective clips to effect electrical communication between the circuit and the clips.

While known intercept connectors have heretofore provided acceptable performance, there remains room for improvement therein. For example, it would be desirable to minimize manufacturing costs and increase the durability of intercept connectors.

It is, therefore, a primary object of the invention to provide a novel intercept connector which is of economical, yet highly durable construction.

SUMMARY OF A PREFERRED EMBODIMENT OF THE INVENTION

A preferred form of the invention intended to accomplish the foregoing object entails an intercept connector having a plurality of contact clips mounted to a backing board of non-conductive material. The clips are arranged for separable connection to a terminal block having a plurality of terminal arms. Each of the contact clips comprises a metallic strip which is folded in a manner defining a base portion, a top portion superposed thereover, and a curved bight portion which is integral with the top and base portions. The bight portion constitutes a spring connection yieldably biasing the distal end of the top portion toward the outer surface of the base portion. At the distal end of the base portion are arranged a pair of outwardly projecting retaining flanges which form a mouth or opening suitable for receiving a terminal arm. The distal end of the base portion terminates at the mouth region and is angled to define a camming lip operable to be raised by an oncoming terminal arm. The base portion includes a pair of spaced tabs which extend through apertures in the backing board. A printed circuit is formed on the backside of the backing board and includes a series of conductive paths terminating at the mounting locations of certain pairs of clips. Disposed on the backside of the backing board, at the clip-mounting locations, are anchor beads of solidified metal, preferably solder. Each anchor bead adheres to both tabs of an associated clip and to an associated circuit path to firmly anchor the clip to the backing board as well as positively electrically connect the clip to the circuit path.

THE DRAWINGS

Other objects and advantages of the present invention will become apparent from the subsequent detailed description thereof in connection with the accompanying drawings in which like numerals designate like elements and in which.

DETAILED DESCRIPTION OF THE PREFERRED EMBODIMENT

Figure 1:
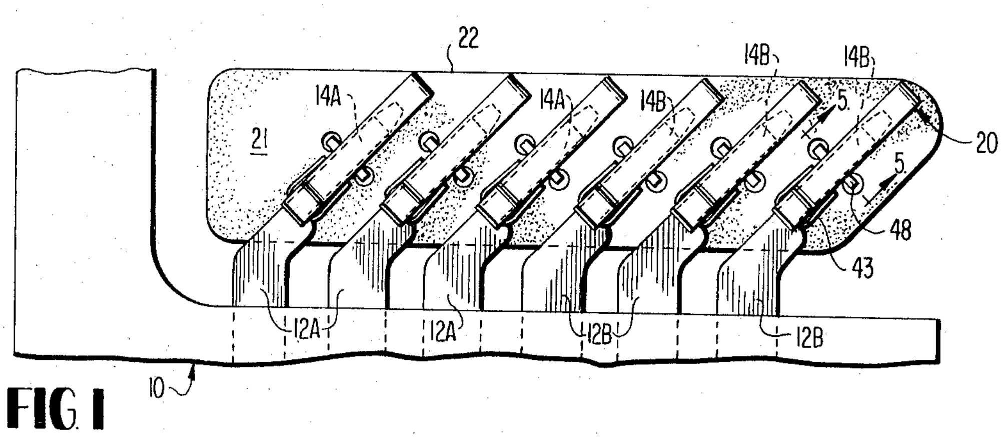
FIG. 1 is an elevational view depicting the manner in which an intercept connector according to the invention is coupled to a terminal block.
Figure 2:
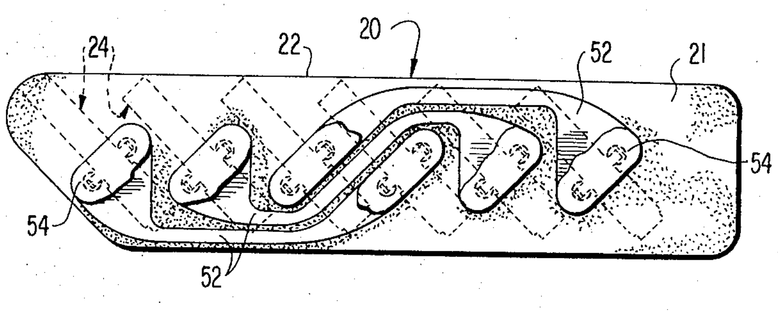
FIG. 2 is a bottom view of the intercept connector.

A portion of a wire wrap terminal block is indicated in FIG. 1 and includes a plurality of wire wrap terminals 12A, 12B, preferably six in number. In normal use, arm portions 14A of three of the terminals 12A are electrically connected in conventional fashion between the main telephone switching system and a subscriber's telephone. The remaining three terminals 12B are connected in conventional manner to an intercept operator facility, with the arms 14B of these intercept terminals 12B being normally free of connections.

When the subscriber's telephone number is changed or cancelled, it may be desirable to re-route incoming calls to the intercept operator facility, such as a recorded message transmitter for example, so that subsequent callers may be given proper instructions. To do this, an intercept connector element 20 is provided in accordance with the invention to cross-connect the main terminals 12A with associated ones of the intercept terminals 12B.

According to a preferred embodiment, the intercept connector 20 includes a backing board 22 formed of any suitable non-conductive material, such as plastic for example. The backing board includes a frontside, or front surface, 21 and a backside, or rear surface, 51. These surfaces are bordered by front and rear edges 21A, 21B, and end edges 21C, 21D. Mounted on the frontside 21 of the backing board 22 are a plurality of contact clips 24 which are arranged in parallel fashion to receive the arms 14A, B of the main and intercept terminals 12A, B.

The contact clips 24 are identical in construction, each including an elongated strip of conductive metal such as phosphor bronze for example, which is folded over upon itself so as to define a base portion 28, a superposed top portion 30, and a curved bight portion 32.

The base portion 28 is arranged such that its inner surface 34 is seated upon the front surface 36 of the backing board 20.

The bight portion 32 is integral and continuous with both the top and base portions 28 and 30. The bight portion 32 constitutes a spring connection between the top and base portions which yieldably urges a distal end 38 of the top portion toward the outer surface 40 of the base portion.

A distal end 42 of the base portion is provided with a pair of outwardly extending retaining flanges 43 which define a mouth 44 configured to receive a terminal arm 14A, B.

The distal end 38 of the top portion 30 terminates in the general region of the mouth 44 and is slightly angled at its tip to define a cam lip 46 which faces the mouth 44 and is operable to be cammed outwardly by an oncoming terminal arm 14A, B.

Figure 3:
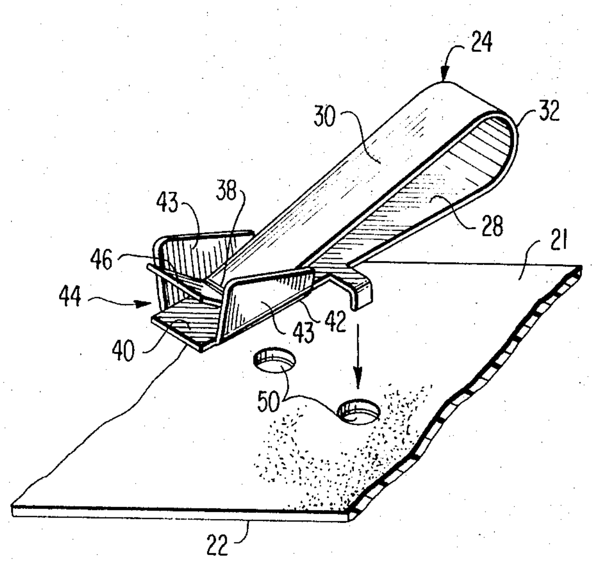
FIG. 3 is an exploded view, in perspective, of a contact clip and a backing board portion of the intercept connector.
Figure 4:
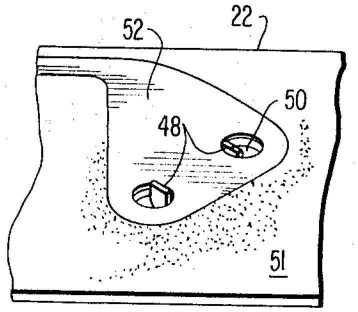
FIG. 4 is a perspective view of the underside of a portion of the intercept connector prior to the application thereto of an anchor bead.

The base portion 28 includes a pair of tabs 48 which extend through apertures 50 in the backing board 20 (FIGS. 3 and 4).

A printed electrical circuit is formed on the backside 51 of the backing board 20. This circuit comprises a series of conductive paths 52 which are formed of suitable conductive metallic material, and which extend between the mounting locations of respective pairs of clips.

Figure 5:
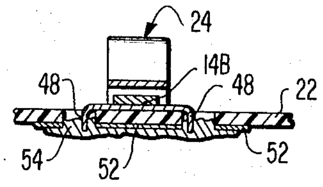
FIG. 5 is a cross-sectional of view taken along line 5—5 of FIG. 1.

Disposed on the backside of the backing board, at the clip-mounting locations, are anchor beads 54 of solidified, conductive metal, preferably solder. The solder beads 54 are applied in liquified form in a manner embedding the tabs 48 of associated clips 24. Upon hardening, the solder adheres to the tabs and the associated conductive paths 52 to firmly anchor the clips to the backing board as well as provide a positive electrical connection between the clips and the printed circuit, as can be seen in FIG. 5.

It is desirable that a plastic coating (not shown) be subsequently applied to the backside of the connector to insulate and protect the connector circuit.

If desired, the tabs 48 may be of such a length that they can project through the apertures 50 by an amount sufficient to allow the tabs to be bent prior to application of the anchor beads, thereby enhancing the securement of the clips to the backing board.

It is also noted that the metallic conductor paths 52 and the anchor beads 54 may be formed of the same or different metals. If different metals are to be employed, they must be of a type capable of mutual coherence or bonding.

The intercept connector 20 is inserted onto the terminal block 10 with the contact clips 24 being aligned with the arms 14A, B of the terminals 12A, B. During insertion, each arm 14A, B, upon engaging the cam lip 46 of the associated contact clip, raises the biased distal end 38 of the top portion 30 of the clip. Once inserted, the arms 14A, B are straddled by the retaining flanges 43 which prevent lateral displacement of the arms from the clips. At the same time, the arms will be engaged by the distal ends of the top clip portions 30 to effect electrical communication therebetween.

It will thus be apparent that the present invention provides that an intercept connector in which the contact clips are attached to the backing board in an economical manner which does not require the use of rivets and distinct mounting plate sections to accommodate such rivets. Instead, provision is made of metal anchor beads 54 which are connected at spaced locations to the contact clips and extend over a relatively large area of the backing board to establish a very effective and durable mechanical connection between the clip and the backing board. Moreover, the firm adherence of these anchor beads to the conductor paths 52, as well as to the tabs 48, assures that a positive, durable electrical connection between the clips and the circuit paths will be established.

Regarding the construction of the clips 24 themselves, it is noted that by locating the curved bite portion 32 of the clip in the manner disclosed, the radius of curvature thereof may be made relatively large, thereby minimizing the destructive effects of bending stresses caused by repeated flexing of the clip. In this fashion, the overall lifespan of the connector may be significantly enhanced.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An intercept connector operable to be releasably connected to the terminal arms of a terminal block to electrically cross-connect selected pairs of said arms, said intercept connector comprising:

a backing board of non-conductive material having front and rear surfaces bordered by front, rear, and end edges;

a plurality of contact clips located on said front surface of said backing board, each contact clip extending at an acute angle relative to said front edge and comprising a folded metallic strip defining:

a base portion having an inner surface seated on the front surface of said backing board;

a top portion superposed over said base portion; and a curved bight portion integral with said top and base portions to define a spring connection therebetween yieldably biasing a distal end of said top portion toward an outer surface of said base portion;

a distal end of said base portion including outwardly projecting retaining flanges defining an arm-receiving mouth;

the distal end of said top portion terminating generally at said receiving mouth and including an angled tip defining a cam lip operable to be raised by an oncoming terminal arm;

said base portion having a pair of spaced tabs located intermediate said retaining flanges and said curved bight portion, said tabs projecting from opposite sides of said base portion and extending through apertures in said backing board, said tabs each including:

a first portion projecting laterally outwardly from a side of said base portion in the plane of said base portion, and a second portion oriented at a right angle to said first portion and projecting into a respective one of said apertures within a plane oriented perpendicular to said backing board, each of said tabs terminating in said last-named plane at the end of said second portion;

printed circuit means fixed on said rear surface of said backing board including a plurality of metallic conductor paths terminating at the mounting locations of selected pairs of clips; and a plurality of anchor beads disposed on said rear surface of said backing board at the mounting locations of said clips, said beads being spaced from one another and from said edges of said backing board to present minimal obstruction to the arrangement of said metallic conductor paths;

said anchor beads each being formed of solidified metal extending between the second portions of an associated contact clip; said metal being disposed at least partially within said apertures and in adhering relation to both tabs of said associated clip and to an associated circuit path, to anchor said clip to said backing board and establish electrical communication between said clip and said circuit path.

2. An intercept connector according to claim 1 wherein said anchor beads comprise solder beads.

3. An intercept connector according to claim 1 wherein said anchor beads and said connector paths comprise the same material.

* * * * *